United States Patent [19]

Süling et al.

[11] 4,223,114
[45] Sep. 16, 1980

[54] PROCESS FOR THE PRODUCTION OF BEAD POLYMERS

[75] Inventors: Carlhans Süling, Odenthal; Gerhard Balle, Leverkusen; Michael Walkowiak, Cologne; Hans-Hermann Schulz, Leichlingen, all of Fed. Rep. of Germany

[73] Assignee: Bayer Aktiengesellschaft, Leverkusen, Fed. Rep. of Germany

[21] Appl. No.: 899,979

[22] Filed: Apr. 25, 1978

[30] Foreign Application Priority Data

Sep. 13, 1977 [DE] Fed. Rep. of Germany ....... 2741196

[51] Int. Cl.$^2$ ............................................ C08L 75/00
[52] U.S. Cl. ..................................... 525/440; 525/58; 525/126; 525/390; 525/424; 525/455; 525/472; 525/920
[58] Field of Search ............. 260/859 R; 525/58, 126, 525/390, 424, 440, 455, 920, 472

[56] References Cited

U.S. PATENT DOCUMENTS

| | | | |
|---|---|---|---|
| 3,509,234 | 4/1970 | Burlant | 260/859 R |
| 3,641,199 | 2/1972 | Niederhauser | 260/859 R |
| 3,677,920 | 7/1972 | Kai | 260/859 R |
| 3,700,752 | 10/1972 | Hutchinson | 260/859 R |
| 3,868,431 | 2/1975 | Hutchinson | 260/859 R |
| 3,876,726 | 4/1975 | Ford | 260/859 R |
| 3,907,751 | 9/1975 | Knight | 260/859 R |
| 3,962,370 | 6/1976 | Hutchinson | 260/859 R |
| 3,968,089 | 7/1976 | Cuscurida | 260/859 R |
| 4,073,828 | 2/1978 | Ferrarini | 260/859 R |
| 4,089,763 | 5/1978 | Dart | 260/859 R |
| 4,129,641 | 12/1978 | Ferrarini | 260/859 R |

FOREIGN PATENT DOCUMENTS

1373182  11/1974  United Kingdom ................ 260/859 R

*Primary Examiner*—Paul Lieberman
*Attorney, Agent, or Firm*—Connolly and Hutz

[57] ABSTRACT

A two-phase bead polymer having an average bead diameter of from 10μ to 150μ comprising (A) 88% to 99.5% by weight of a polymer of polymerized units of at least one methacrylic acid ester containing from 1 to 10 carbon atoms in the aliphatic, saturated alcohol component; and (B) 0.5% to 12% by weight of a polyurethane which has been obtained from (1) at least one dihydroxy compound, (2) a diisocyanate from the group comprising (a) aliphatic diisocyanates having a branched carbon skeleton of 7 to 26 carbon atoms, (b) cycloaliphatic diisocyanates and (c) aliphatic or cycloaliphatic diisocyanates modified by radical graft copolymerization with vinyl monomers, (3) an aliphatic or cycloaliphatic diamine and (4) a monofunctional chain terminator.

20 Claims, No Drawings

PROCESS FOR THE PRODUCTION OF BEAD POLYMERS

This invention relates to a process for the production of bead polymers by the radical bead polymerisation of methacrylic acid esters and, optionally, other monomers in the presence of monomer-soluble polyurethanes and a dispersant in an aqueous medium.

Polymethyl methacrylate beads are used as starting materials for dental plastics. The production of dental beads such as these on the basis of homopolymers and copolymers of methyl methacrylate by the process of bead polymerisation is known and is described, for example, in Houben-Weyl, Methoden der Organischen Chemie, Vol. XIV/1, pages 406 to 420 and pages 1053 to 1058.

Polymer beads with a defined grain size distribution can be obtained by known methods and these polymer beads can be processed, for example, into injection-moulded articles or into extruded profiles. It is also possible to process these polymer beads into false teeth by the "powder/liquid process" according to German Pat. No. 737,058.

Articles and objects of polymethyl methacrylates are attended by the disadvantage of a very low impact strength. This disadvantage restricts the use of polymethyl methacrylates as starting materials for false teeth or makes it necessary to offset the disadvantage at least partly by way of complicated constructions.

It is known that the impact strength or articles or objects of polymethyl methacrylates can be improved by introduction of polymeric additives during polymerisation of the monomer. Additives with pronounced rubber or elastomer properties are generally used. According to German Offenlegungsschrift No. 2,161,496, for example, the toughness of polymethyl methacrylates can be improved by producing cross-linked polymers having glass temperatures below 0° C. in the reaction medium during the bulk polymerisation of methyl methacrylate and subsequently completing the bulk polymerisation of the methyl methacrylate in moulds. Suitable crosslinked polymers are vinyl polymers containing functional groups, for example hydroxyl groups, crosslinked with polyisocyanates.

Furthermore, it is known from German Offenlegungsschrift No. 2,003,365 that polymers with different contents of methyl methacrylate polymers and crosslinked polyurethanes can be produced with improved toughness by producing a gel of methyl methacrylate and a crosslinked polyurethane and subsequently carrying out a bulk polymerisation reaction with this gel in a predetermined mould.

Finally, it is known that polyurethanes obtained by polyaddition from compounds containing at least two hydroxyl groups, diisocyanates and a polymerisable, ethylenically unsaturated compound containing a group reactive with isocyanate groups and methyl methacrylate and, optionally, other monomers can be bulk polymerised in moulds. The polyurethane can even be produced in methyl methacrylate as solvent. The methyl methacrylate and the other optional monomers can be incorporated into the polyurethane molecule during the polymerisation reaction. The end polymers are said to show improved mechanical properties, such as increased impact strength, by comparison with unmodified methyl methacrylate polymers (cf. German Offenlegungsschrifts Nos. 2,312,973 and 2,033,157).

It has now been found that improved dental beads which can be processed into dental plastics by the powder/liquid process can be obtained by carrying out the radical polymerisation of methyl methacrylate by the process of bead polymerisation using a dispersant in the presence of a monomer-soluble polyurethane urea elastomer which has been synthesised from relatively high molecular weight dihydroxy compounds, special diisocyanates defined in detail in the following, aliphatic or cycloaliphatic diamines and, optionally, chain terminators reacting monofunctionally with respect to isocyanates.

Thus, the present invention provides two-phase bead polymers having an average bead diameter of from $10\mu$ to $150\mu$ comprising (A) 88 to 99.5% by weight of a polymer of polymerised units of at least one methacrylic acid ester containing from 1 to 10 carbon atoms in the aliphatic, saturated alcohol component, the methacrylic ester polymer optionally containing up to 30% by weight of copolymerised units of at least one monomer from the group comprising acrylic acid esters containing from 1 to 10 carbon atoms in the aliphatic, saturated alcohol component, hydroxyalkyl esters of acrylic or methacrylic acid containing from 2 to 4 carbon atoms in the alkyl group, styrene, vinylacetate, acrylamide, methacrylamide, acrylic acid, methacrylic acid and itaconic acid, and (B) 0.5 to 12% by weight of a polyurethane which has been obtained from
  (1) at least one dihydroxy compound,
  (2) at least one diisocyanate from the group comprising
    (a) aliphatic diisocyanates having a branched carbon skeleton of 7 to 36 carbon atoms,
    (b) cycloaliphatic diisocyanates and
    (c) aliphatic or cycloaliphatic diisocyanates modified by radical graft copolymerisation with vinyl monomers,
  (3) aliphatic or cycloaliphatic diamines and
  (4) monofunctional chain terminators optionally containing unsaturated groups.

The present invention also provides a process for the production of two-phase bead polymers, wherein a solution of ($A_1$) 88 to 110 parts by weight of at least one methacrylic acid ester containing from 1 to 10 carbon atoms in the aliphatic, saturated alcohol component, up to 40 parts by weight of the methacrylic acid ester optionally comprising at least one monomer from the group comprising acrylic acid esters containing from 1 to 10 carbon atoms in the aliphatic, saturated alcohol component, hydroxyalkyl esters of acrylic or methacrylic acid containing from 2 to 4 carbon atoms in the alkyl group, styrene, vinylacetate, acrylamide, methacrylamide, acrylic acid methacrylic acid and itaconic acid, and ($B_1$) 0.5 to 12 parts by weight of a polyurethane which has been obtained from
  (1) at least one dihydroxy compound,
  (2) at least one diisocyanate from the group comprising
    (a) aliphatic diisocyanates having a branched carbon skeleton of 7 to 36 carbon atoms,
    (b) cycloaliphatic diisocyanates and
    (c) aliphatic or cycloaliphatic diisocyanates modified by radical grafter copolymerisation with vinyl monomers,
  (3) aliphatic or cycloaliphatic diamines and (4) monofunctional chain terminators optionally containing unsaturated groups, is polymerised in from 0.7 to 3.5 parts by weight and preferably from 1 to 2.5 parts by weight of an aqueous medium per part by weight of the solution of ($A_1$) and ($B_1$), under the conditions of bead polymerisation in the presence of from 0.5 to 2.5% by weight, based on polymerisable compounds, of at least one monomer-soluble radical former and from 0.5 to 100% by weight, based on polymerisable compounds, of a dispersant and optionally, in the presence of from 0.01 to 2% by weight, based on polymerisable compounds, of an anionic emulsifier at a temperature of from 20° C. to 120° C., at normal pressure or under a pressure of up to 20 bars.

It is surprising that the bead polymerisation reaction can be carried out satisfactorily in the presence of these polyurethane ureas because, on the one hand, the polymer formed and the elastomer dispersed therein form two separate phases and because, on the other hand, solutions of polyurethane urea elastomers in methacrylic acid esters are characterised by a considerably increased viscosity in relation to the pure monomer which is attributable to strong intermolecular associations between the urea structural elements and which had been expected to give rise to the formation of relatively coarse beads unsuitable for use as a starting material for dental preparations.

The polyurethane ureas are distinguished from the polyurethane elastomers by improved mechanical properties, particularly tensile and ultimate tensile strength, elongation at break and elasticity, and also by their dependence on temperature. This is the result of the strong association of the urea groups through hydrogen bridges to form so-called hard segments which effect a physical crosslinking of the elastomer. These hard segments are attached to one another through the chains of the polyol component forming the soft segment. This structure of the elastomer is obtained by using diamines in the polyaddition reaction with the polyisocyanate.

The polyurethane urea elastomers used are produced by the methods normally used in polyurethane chemistry, i.e. by polyaddition, from one or more relatively high molecular weight, substantially linear diols having a molecular weight of from 400 to 6000, of which can comprise of from 0.5 to 25 mole % of short-chain linear or branched aliphatic diols containing from 2 to 8 carbon atoms or their lower oligomers having a molecular weight of from 62 to 400, and from a diisocyanate, a diamine acting as chain extender and a chain terminator which is monofunctional with respect to isocyanate and which optionally contains a polymerisable double bond. The procedures which may be adopted include the so-called one-shot process in which all the components are combined and reacted in a single stage to form the final polyurethane, and also the two-stage or prepolymer process. In the latter process, which is preferred for carrying out the present invention, a prepolymer containing terminal isocyanate groups is initially prepared from the diol component or components and a stoichiometric excess of the diisocyanate and is extended in a second stage by reaction with the diamine. The first stage may be carried out in bulk; during chain extension, an excessive increase in viscosity can be prevented by adding an organic solvent which is inert to isocyanates. When the viscosity of the solution, which is a measure of the molecular weight of the polyurethane urea, reaches a predetermined desired value, addition of the diamine is stopped. Any free NCO-groups still present are closed by means of a monofunctional chain terminator. This procedure provides for better control of the distribution of the various chain units along the polyurethane chain and enables the progress of the reaction to be followed by measuring the viscosity.

Suitable relatively long chain diols containing two terminal hydroxyl groups in the molecule are, preferably, polyesters, polyethers, polyacetals, polycarbonates, polyester amides and polyamides which have a molecular weight of from 400 to 6000 and which preferably have a glass transition temperature of $\leq -20°$ C. Polyester and polyether diols are particularly preferred.

The polyesters containing two hydroxyl groups which may be used in accordance with the present invention are, e.g., reaction products of dihydric alcohols with dibasic carboxylic acids. Instead of using the free polycarboxylic acids, it is also possible to use the corresponding polycarboxylic acid anhydrides or corresponding polycarboxylic acid esters of lower alcohols or their mixtures for producing the polyesters. The polycarboxylic acids, the corresponding polycarboxylic acid anhydrides or the corresponding polycarboxylic acid esters may be aliphatic, cycloaliphatic, aromatic and/or heterocyclic and may optionally be substituted, e.g., by halogen atoms, and/or unsaturated. Examples of these compounds are succinic acid, adipic acid, suberic acid, azelaic acid, sebacic acid, phthalic acid, isophthalic acid, phthalic acid anhydride, tetrahydrophthalic acid anhydride, hexahydrophthalic acid anhydride, tetrachlorophthalic acid anhydride, endomethylene tetrahydrophthalic acid anhydride, glutaric acid anhydride, maleic acid, maleic acid anhydride, fumaric acid, dimeric fatty acids, such as oleic acid, terephthalic acid dimethyl ester, terephthalic acid-bis-glycol ester. Suitable polyhydric alcohols are, for example, ethylene glycol, 1,2- and 1,3-propylene glycol, 1,4- and 2,3-butylene glycol, 1,6-hexane diol, 1,8-octane diol, neopentyl glycol, cyclohexane dimethanol (1,4-bis-hydroxymethylcyclohexane), 2-methyl-1,3-propane diol, also diethylene glycol, triethylene glycol, tetraethylene glycol, polyethylene glycols, dipropylene glycol, polypropylene glycols, dibutylene glycol and polybutylene glycols. Polyesters of lactones, for example ε-caprolactone, or hydroxycarboxylic acids, for example ω-hydroxy caproic acid, may also be used.

The polyethers containing two hydroxyl groups which may be used in accordance with the invention are also known per se and are obtained, for example, by the polymerisation of epoxides, such as ethylene oxide, propylene oxide, butylene oxide, tetrahydrofuran, styrene oxide or epichlorhydrin on their own, for example in the presence of $BF_3$, or by the addition of these epoxides, optionally in admixture or successively, with starter components containing reactive hydrogen atoms, such as alcohols or amines, for example water, ethylene glycol, 1,3- or 1,2-propylene glycol, 4,4'-dihydroxy diphenyl propane or aniline. Polyethers predominantly containing primary OH-groups (up to 90% by weight, based on all the OH-groups present in the polyether) are particularly preferred.

Suitable polyacetals are, for example, the compounds obtainable from glycols, such as diethylene glycol, triethylene glycol, 4,4'-dioxethoxy diphenyl dimethyl methane, hexane diol and formaldehyde. Polyacetals suitable for the purposes of the invention can also be produced by the polymerisation of cyclic acetals.

Polycarbonates containing hydroxyl groups which may be used in accordance with the present invention are those known per se which may be obtained, for example, by reacting diols, such as 1,3-propane diol, 1,4-butane diol and/or 1,6-hexane diol, diethylene glycol, triethylene glycol, tetraethylene glycol, with diaryl carbonates, for example diphenyl carbonate, or phosgene.

Representatives of these compounds which may be used in accordance with the invention are described, for example, in High Polymers, Vol. XVI, "Polyurethanes, Chemistry and Technology" by Saunders-Frisch, Interscience Publishers, New York, London, Vol. I, 1962, pages 32 to 42 and pages 44 to 54 and Vol. II, 1964, pages 5 to 6 and 198 to 199, and in Kunststoff-Handbuch, Vol. VII, Viewag-Hochtlen, Carl-Hanser-Verlag, Munich, 1966, for example on pages 45 to 71.

The short-chain diols having molecular weights of from 62 to 400 which may optionally be used are identical with the diols used in the synthesis of the above-mentioned polyester diols.

The choice of the suitable diisocyanate is limited by the need for high light stability which can only be obtained by using aliphatic or alicyclic diisocyanates, and also by the fact that the acrylic and methacrylic acid esters, particularly methyl methacrylate, which are used as solvents for the polyurethane urea elastomer are thermodynamically poor solvents for the elastomer. This is reflected on the one hand in the steep increase in viscosity with increasing content of urea groups in the polymer chain, whilst on the other hand the use of aliphatic diisocyanates having a linear chain structure results in the formation of clouded solutions. This is attributable to the fact that, on account of the missing steric hinderance, the polyurea segments formed associate so strongly that they crystallise out of the solution to a certain extent. As a result, the polymers obtained from the solutions are also clouded. This is the case for example, with the aliphatic diisocyanate most commonly used in practice, hexamethylene diisocyanate. Accordingly, aliphatic diisocyanates which are suitable for producing the polyurethane urea elastomer solutions according to the invention are aliphatic diisocyanates which have a fairly complex, non-linear structure and which therefore assist in finding a compromise between the basically desirable association of the urea segments with one another and the optical qualities of the product. Aliphatic diisocyanates sucu as these are:

(A) aliphatic diisocyanates having a branched carbon skeleton of 7 to 36 carbon atoms, for example 2,2,4- or 2,4,4-trimethyl hexane-1,6-diisocyanate or technical mixtures thereof, diisocyanates derived from esters of lysine or diisocyanates based on dimerised fatty acids which are obtained in known manner by converting dicarboxylic acids such as ones containing 36 carbon atoms into the corresponding diamines, followed by phosgenation;

(B) cycloaliphatic diisocyanates, for example, 1,3-cyclobutane diisocyanate, 1,3- and 1,4-cyclohexane diisocyanate, 2,4- or 2,6-diisocyanato-1-methyl cyclohexane or 4,4'-diisocyanatodicyclohexyl methane, either in the form of the pure geometric isomers or commercial mixtures thereof, also 1-isocyanato-3,3,5-trimethyl-5-isocyanatomethyl cyclohexane (isophorone diisocyanate); and finally (C) aliphatic or cycloaliphatic diisocyanates modified by radical graft copolymerisation with vinyl monomers, of the type obtained by polymerising from 10 to 100 parts and preferably from 20 to 75 parts of a vinyl monomer, preferably methyl methacrylate, in the presence of 100 parts of the diisocyanate by means of a radical polymerisation initiator, for example an organic peroxide, such as benzoyl peroxide, tert.-butyl peroctoate, etc., or an aliphatic azo compound such as azoisobutyronitrile. In addition to the already mentioned diisocyanates, suitable graft substrates are also aliphatic diisocyanates having a linear carbon chain, for example hexamethylene diisocyanate. It has been found that aliphatic diisocyanates modified in this way lead to polyurethane urea elastomers which form clear solutions in monomeric methyl methacrylate and give clear polymers providing the refractive indices of the polymer phase and the viscous phase are correctly matched.

It is preferred to use isophorone diisocyanate and hexamethylene diisocyanate or isophorone diisocyanate modified by graft copolymerisation with methyl methacrylate and having a polymer content of up to 50%, preferably up to 40%.

Diamines suitable for chain extension in accordance with the invention are alkylene diamines containing from 2 to 36 carbon atoms, for example hexamethylene diamine, undecamethylene diamine, 2,2,4- or 2,4,4-trimethyl-1,6-diaminohexane or commercial mixtures thereof, diamines derived from dimeric fatty acids containing up to 36 carbon atoms, also cycloaliphatic diamines containing from 5 to 25 carbon atoms, for example the various diaminocyclohexanes, diaminohexahydrotoluenes and diaminodicyclohexyl methanes either in the form of the pure position and geometric isomers or in the form of commercial isomer mixtures and also 1-amino-3,3,5-trimethyl-5-aminomethyl cyclohexane (isophorone diamine). The latter diamine is preferably used.

Chain terminators for the free isocyanate groups which may still be present after chain extension are compounds reacting monofunctionally with respect to isoyanates, for example alcohols or amines. They may be saturated (which is often preferred) or olefinically unsaturated. In the latter case, the unsaturated groups thus introduced into the polyurethane urea may take part in he polymerisation of the methyl methacrylate, so that a link is obtained between the polymer phase and the viscous phase. Suitable and preferred saturated chain terminators are, for example, the lower aliphatic alcohols, preferably containing from 1 to 4 carbon atoms, such as methanol, ethanol or butanol, or aliphatic monoamines, preferably containing from 1 to 6 carbon atoms, such as butylamine, dibutylamine or cyclohexylamine. Polymerisable double bonds may be introduced by, for example, allyl alcohol, allylamine or hydroxyalkyl esters (containing from 2 to 4 carbon atoms in the alkyl group), of $\alpha,\beta$-unsaturated carboxylic acids containing from 3 to 5 carbon atoms, such as 2-hydroxyethyl methacrylate. There are preferably used allyl alcohol and 2-hydroxyethyl methacrylate.

The choice of a suitable dispersant or dispersant system is important to the production of the bead polymers. Suitable dispersants are finely divided inorganic compounds which are insoluble in the polymerisation medium and which may optionally be produced by a reaction in the polymerisation medium. Particularly suitable dispersants are in soluble salts of the alkaline earth metals for example, alkaline earth metal sulphates, alkaline earth metal phosphates and alkaline earth metal carbonates. Magnesium carbonate is particularly suitable.

Other suitable dispersants are polymethacrylic acids or copolymers, for example of methacrylic acid with metacrylic acid methyl ester, or polyvinyl alcohols or partially hydrolysed polyvinyl acetates. Derivatives of cellulose, for example, methyl cellulose, are also suitable dispersants.

The dispersants are used in quantities of from 0.5% to 100% by weight and preferably in quantities of from 1% to 50% by weight, based on polymerisable compounds.

It can be advantageous to carry out the bead polymerisation reaction in the presence of small quantities of an emulsifier. Particularly suitable emulsifiers for this purpose are anionic emulsifiers, for example the alkali metal salts of long-chain aliphatic sulphonic acids containing from 6 to 30 carbon atoms or the alkali metal salts of sulphates of long-chain alcohols containing from 6 to 30 carbon atoms. Sodium stearate or potassium oleate are also useful additives. The alkali metal salts of sulpho-succinic acid semiesters have proved to be extremely suitable.

The emulsifiers may be used in quantities of from 0.001% to 2% by weight and preferably in quantities of from 0.05% to 1% by weight, based on polymerisable compounds.

Suitable polymerisation initiators are radical formers, i.e. compounds or mixtures of compounds which decompose into radicals and which are able to initiate a polymerisation reaction. The radical formers must be soluble in the monomers, although this does not prevent them from also being soluble in the aqueous polymerisation medium. Particularly suitable polymerisation initiators are peroxidic compounds or aliphatic azo compounds. Radical formation may be obtained with advantage at even relatively low reaction temperatures by using known redox activators. In most cases, however, it has proved to be favourable to carry out the polymerisation reaction with diacyl peroxides which show high monomer solubility. Suitable diacyl peroxides are benzoyl peroxide, chlorobenzoyl peroxide, lauroyl peroxide. In addition, percarbonates for example, dicyclohexyl percarbonate or alkylacyl peroxides, such as tert.-butyl perpivalate, are suitable initiators for the bead polymerisation reaction according to the invention.

In many cases, the use of mixtures of diacyl peroxides and alkylacyl peroxides affords particular advantages in cases where it is intended to form starter radicals even at relatively low temperatures. The radical formers or their mixtures are used in quantities of from 0.5 to 2.5% by weight and preferably in quantities of from 0.7 to 1.5% by weight, based on polymerisable compounds. In the context of the invention, polymerisable compounds are polymerisable compounds containing C—C-double bonds.

The polymerisation temperature is dependent upon the boiling point of the monomer of monomer mixture used and is in the range from 20° C. to 120° C., depending upon the decomposition temperature of the peroxidic initiator used. The polymerisation reaction is preferably carried out at temperatures of from 50° C. to 90° C., particularly good results being obtained at temperatures in the range from 60° C. to 85° C.

In the context of the present invention, the process of bead polymerisation of monomers is understood to be the polymerisation of these monomers in a stirred or "turbined" aqueous medium. Relatively fine or relatively coarse beads with a narrow or wide grain size distribution are obtained, depending upon the stirring speed to be adjusted and upon the construction of the stirrer.

In the context of the present invention, the aqueous medium used is understood to be water which contains the polymerisation auxiliaries in solution, dispersion or emulsion. These auxiliaries are essentially the above-described dispersants, emulsifiers and also buffer substances and, proportionately, even radical formers.

Effective stirrer systems are normally used for dispersing the monomers, high-speed anchor or paddle stirrers which generate a high degree of turbulence in the reaction medium which is maintained throughout the polymerisation reaction being particularly effective. The polymerisation reaction may be carried out at normal pressure or under excess pressure. Particularly good results are obtained when the polymerisation reaction is carried out under elevated nitrogen pressures of up to 20 bars, preferably up to 8 bars.

The monomers are polymerised up to as high a conversion as possible. In general, the monomer conversion amounts to between 85% and 95%.

The two-phase bead polymers according to the invention may be processed for the production of injection-moulded articles or extruded profiles. However, they are primarily used as dental beads for dental applications, particularly by the "powder/liquid process", for example according to German Pat. No. 738,058.

The parts and percentages quoted in the following Examples relate to weight, unless otherwise stated.

Production of the polyurethane urea solutions in methyl methacrylate used

Polyurethane solution I:

425 g (0.5 equivalent) of a polyester diol of adipic acid, 1,6-hexane diol and neopentyl glycol having a hydroxyl number of 66 and a molecular weight $\overline{M}_n$ of 1700 (polyester A) were dehydrated in vacuo for 30 minutes at 110° C. 83.3 g (0.75 equivalent) of isophorone diisocyanate (IPDI) were then added at 100° C. After 4.5 hours, the NCO-number had fallen to 1.99% and remained constant at that value. The melt of the prepolymer was taken up in 2000 g of methyl methacrylate. The demand of isophorone diamine (IPDA) as chain extender amounts to 20.4 g, as calculated from the NCO-number. This quantity was diluted to 100 ml with methyl methacrylate and the solution was introduced at 40° C. into the prepolymer solution. A steady increase in viscosity was observed. 30 minutes after the addition, the viscosity amounted to 2000 cP, as measured with a Haake-Viskotester, spindle No. 1, at 23° C. The solids content amounted to 20%.

Polyurethane solution II:

The mixture used was the same as for solution I, except that the reaction of the polyester with the isocyanate was catalysed by the addition of dibutyl tin dilaurate. After 3 hours, the NCO-number reached a constant value of 2.1%. After the prepolymer had been dissolved in monomeric methyl methacrylate, a solution of 21.6 g of trimethyl hexamethylene diamine (mixture of equal parts of the 2,2,4- and 2,4,4-isomer) in 80 g of methyl methacrylate was added dropwise at a temperature of 40° C. Chain extension was terminated after 90% of the solution had been added and 3 ml of methanol were added to the solution. Viscosity at 23° C.: 4500 cP, solids content: 20%.

Polyurethane solution III:

297.5 g (0.35 equivalent) of polyester A (see solution I) and 131.3 g (0.15 equivalent) of a linear polyester diol of adipic acid, phthalic acid anhydride and ethylene glycol having a OH-number of 64 and an average molecular weight $\overline{M}n$ of 1750 (polyester B) were melted and, without preliminary dehydration, the resulting melt was reacted with 72.2 g (0.65 equivalent) of PDI up to an NCO-group content of 1.19%. The melt was dissolved in 2,000 g of methyl methacrylate. 11.95 g of IPDA were dissolved in methyl methacrylate to make up to 100 ml solution. The solution was added in several portions until a viscosity of 880 cP at 23° C. was reached. This was the case after 90% of the solution has been added. 1.0 g of β-hydroxyethyl methacrylate and 0.1 of tin dioctoate were added for chain termination, after which the solution was homogeneously stirred and left standing overnight. The solids content of the resulting solution amounted to 20%.

Polyurethane solution IV:

Without preliminary dehydration, 297.5 g (0.35 equivalent) of polyester A and 131.3 g (0.15 equivalent) of polyester B were reacted at 100° C. with 78.8 g (0.75 equivalent) of a modified hexamethylene diisocyanate which had been obtained by polymerising 20 parts by weight of methyl methacrylate dissolved in 80 parts of hexamethylene diisocyanate in the presence of 0.1 part by weight of azoisobutyronitrile and which had an NCO-group content of 40.0%. The reaction was continued until the NCO-content had reached 1.99%, after which the reaction mixture was taken up in 2000 g of methyl methacrylate and extended at 40° C. with the calculated quantity of 20.6 g of IPDA dissolved to 100 ml in methylene methacrylate. After 90% of this solution had been added, the viscosity reached a value of 750 cP/23° C. The reaction was then stopped by the addition of 1.6 g of 2-hydroxyethyl methacrylate and 0.1 g of tin dioctoate. The clear colourless solution obtained had a solids content of 20%.

Polyurethane urea solution V:

A mixture of 2965 g (1.75 mole) of polyester A and 1275 g (0.75 mole) of polyester B was melted and, without dehydration, was reacted for 6 hours at 100° C. with 722 g (3.25 moles) of isophorone diisocyanate. Thereafter the NCO-group content amounted to 1.19%. The reaction mixture was taken up in 24800 g of methyl methacrylate, after which an extender solution, which had been produced by dissolving the equivalent quantity of 119.5 g (0.7 mole) of isophorone diamine in methyl methacrylate to a total volume of 1000 ml, was added in portions to the clear solution over a period of 4 hours at a temperature of 40° C. The increase in viscosity was monitored. After 90% of the extender solution had been added, the viscosity reached a value of 880 cP (23° C.). The addition was stopped and 10 g of 2-hydroxyethyl methacrylate and 1 g of tin dioctoate, both dissolved in a little methyl methacrylate, were added to the reaction mixture. After 20 hours, no more isocyanate could be detected in the solution. The solids content amounted to 20%.

EXAMPLE 1

In a polymerisation vessel equipped with a so-called fir-tree stirrer, 1875 parts by weight of magnesium carbonate were suspended in 18500 parts by weight of water, after which 4050 parts by weight of water containing 0.5 part by weight of lauryl sulphate were introduced into this stirred magnesium carbonate suspension. 7566 parts by weight of methyl methacrylate (MAM) and 234 parts by weight (solids) of the polyurethane prepared under the heading of polyurethane solution I, together with 12 parts by weight of cyclohexyl percarbonate and 12 parts by weight of lauroyl peroxide, were dispersed as a monomer-polyurethane mixture for about 20 minutes at a stirring speed of 250 rpm. The pressure was adjusted to an excess pressure of 2 bars by introducing nitrogen under pressure, after which the reactor was heated to 80° C. and kept at that temperature for 2 hours.

After cooling to room temperature, a pH-value of 2.5 was adjusted by the addition of $H_2SO_4$ and the supernatant liquid was decanted off from the polymer beads. At the same time, the polymer beads containing gas bubbles (300 parts by weight) were separated off. The remaining polymer beads were washed with water until the washing water had a pH-value of <5. After drying at 50° C., 7020 parts by weight of polymer beads were obtained. Screen analysis gave an LZ (average grain size) of 62.

EXAMPLE 2

The procedure was as described in Example 1, except that, instead of "polyurethane solution I", a corresponding quantity of polyurethane solution II was used and the lauryl sulphate was replaced by the same quantity of the sodium salt of sulphosuccinic acid octyl semiester. Dental beads were obtained in a yield of 7200 parts by weight along with 90 parts by weight of polymer beads containing gas bubbles.

Screen analysis of the dental beads gave an LZ of 35.

EXAMPLE 3

The procedure was as described in Example 2 except that a mixture of methyl methacrylate and the polyurethane, the production of which is described under the heading solution V, is used with the proviso that 7050 parts by weight of methyl methacrylate and 450 parts by weight (solids) of polyurethane are used for polymerisation. Polymer beads were obtained in a yield of 7000 parts by weight. Screen analysis showed that they had an LZ of 54.

EXAMPLE 4

In a polymerisation vessel, 0.4 part by weight of the sodium salt of sulphosuccinic acid ester (sulphosuccinic acid octyl ester) and 150 parts by weight of polyvinyl pyrrolidone having a K-value of 90 were dissolved in 23,000 parts by weight of water. A pH-value of 9 was adjusted by the addition of sodium carbonate, after which the following peroxide/monomer mixture was poured over this aqueous solution:

- 7050 parts by weight of methacrylic acid methyl ester
- 450 parts by weight of polyurethane solids (polyurethane solution V)
- 12 parts by weight of lauryl peroxide
- 12 parts by weight of cyclohexyl percarbonate.

The atmospheric oxygen in the reactor was then displaced by nitrogen and a nitrogen pressure of 6 atms gauge was adjusted. The stirrer, in the form of a so-called fir-tree stirrer, was slowly brought to a speed of 3000 rpm. After 20 minutes, the temperature was increased to 80° C. and was kept at tht level for 3 hours. After the polymerisation mixture had been brought to room temperature and vented, the polymer beads were washed and small numbers of floating beads were separated off by decantation.

Polymer beads having an LZ of 128 were obtained in a yield of 74% by weight.

We claim:

1. A two-phase bead polymer having an average bead diameter of from 10μ to 150μ comprising
   (A) 88% to 99.5% by weight of a polymer of polymerised units of at least one methacrylic acid ester containing from 1 to 10 carbon atoms in the aliphatic, saturated alcohol component; and
   (B) 0.5% to 12% by weight of a monomer-soluble polyurethane which has been obtained from (1) at least one dihydroxy compound, (2) a diisocyanate from the group comprising (a) aliphatic diisocyanates having a branched carbon skeleton of 7 to 26 carbon atoms, (b) isophorone diisocyanate and (c) aliphatic or cycloaliphatic diisocyanates modified by radical graft copolymerisation with vinyl monomers, (3) an aliphatic or cycloaliphatic diamine and (4) a monofunctional chain terminator.

2. A two-phase bead polymer as claimed in claim 1 wherein the component (A) comprises up to 30% by weight of copolymerised units of at least one monomer comprising one or more of acrylic acid esters containing from 1 to 10 carbon atoms in the aliphatic, saturated alcohol component, hydroxyalkyl esters of acrylic and methacrylic acids containing from 2 to 4 carbon in the alkyl group, styrene, vinylacetate, acrylamide, methacrylamide acrylic acid, methacrylic acid and itaconic acid.

3. A two-phase bead polymer as claimed in claim 1 wherein the monofunctional claim terminator, component (B4) contains unsaturated groups.

4. A two-phase bead polymer as claimed in claim 1, wherein component (B1) is a substantially linear bifunctional hydroxyl compound having a molecular weight $\overline{M}n$ (number average) of from 400 to 6000 and a glass transition temperature of $\leq -20°$ C. from the group comprising polyesters, polyethers, polyacetals, polycarbonates, polyester amides and polyamides.

5. A two-phase bead polymer as claimed in claim 1, wherein component (B1) is a polyester or polyether diol.

6. A two-phase bead polymer as claimed in claim 4, wherein component (B1) also contains a linear or branched aliphatic diol containing from 2 to 8 carbon atoms in the molecule or a lower oligomer thereof having a molecular weight $\overline{M}n$ of from 62 to 400 in a quantity of from 0.5 to 25 mole % in the mixture of the components B1.

7. A two-phase bead polymer as claimed in claim 1, wherein component B4 is a compound which is free from olefinically unsaturated polymerisable groups and which contains at least one hydroxyl group.

8. A two-phase bead polymer as claimed in claim 1, wherein component B4 is a lower, aliphatic saturated alcohol containing from 1 to 4 carbon atoms or an aliphatic monoamine containing from 1 to 6 carbon atoms.

9. A two-phase bead polymer as claimed in claim 1, wherein component B4 is allyl alcohol or at least one hydroxy alkyl ester containing from 2 to 4 carbon atoms in the alkyl group of an $\alpha,\beta$-monoolefinically unsaturated carboxylic acid containing from 3 to 5 carbon atoms.

10. A two-phase bead polymer as claimed in claim 1, wherein component B4 is 2-hydroxyethyl methacrylate.

11. A process for producing a two-phase bead polymer as claimed in claim 1, wherein
    (A1) 88 to 110 parts by weight of at least one methacrylic acid ester containing from 1 to 10 carbon atoms in the aliphatic, saturated alcohol component, and
    (B1) 0.5 to 12 parts by weight of a monomer soluble polyurethane which has been obtained from (1) at least one dihydroxy compound, (2) a diisocyanate from the group comprising (a) aliphatic diisocyanates having a branched carbon skeleton of 7 to 36 carbon atoms, (b) isophorone diisocyanate and (c) aliphatic or cycloaliphatic diisocyanates modified by radical graft copolymerisation with vinyl monomers, (3) aliphatic or cycloaliphatic diamines and (4) a monofunctional chain terminator optionally containing unsaturated groups, is polymerised in aqueous medium, 0.7 to 3.5 parts by wt. of aqueous medium being present per part by weight of the solutions of (A1) and (B1), under the conditions of bead polymerisation in the presence of from 0.5 to 2.5% by weight, based on polymerisable compounds, of at least one monomer-soluble radical former, from 0.5 to 100% by weight, based on polymerisable compounds, of a dispersant at a temperature of from 20° to 120° C.

12. A process, as claimed in claim 11, wherein the component (A1) comprises up to 40 parts by wt. of at least one monomer comprising acrylic acid esters containing from 1 to 10 carbon atoms in the aliphatic, saturated alcohol component, hydroxy alkyl esters of acrylic or methacrylic acid containing from 2 to 4 carbon atoms in the alkyl group, styrene, vinylacetate, (meth)-acrylamide, (meth)-acrylic acid and itaconic acid.

13. A process as claimed in claim 11 wherein the polymerisation is carried out at normal pressure.

14. A process as claimed in claim 11, wherein the polymerisation is carried out at a pressure of up to 20 bars.

15. A process as claimed in claim 11, wherein the polymerisation is carried out in the presence of from 0.01 to 2% by weight based on polymerisable compounds of an anionic emulsifier.

16. A process as claimed in claim 11, wherein at least one water-insoluble salt of an alkaline earth metal is used as the dispersant.

17. A process as claimed in claim 11, wherein $MgCO_3$ is used as the dispersant.

18. A process as claimed in claim 11, wherein polymethacrylic acid is used as the dispersant.

19. A process as claimed in claim 11, wherein polyvinyl alcohol is used as the dispersant.

20. A process as claimed in claim 11, wherein polyvinyl pyrrolidone is used as the dispersant.

* * * * *